(12) United States Patent
Haselmann et al.

(10) Patent No.: US 10,807,293 B2
(45) Date of Patent: Oct. 20, 2020

(54) GUIDING DEVICE AND METHODS FOR GUIDING A PLASTIC FILM, AND BLOWN FILM INSTALLATION

(71) Applicant: Windmöller & Hölscher KG, Lengerich (DE)

(72) Inventors: Simon Haselmann, Lengerich (DE); Jürgen Linkies, Lengerich (DE); Jens Goldenstein, Lengerich (DE); Markus Bussmann, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 238 days.

(21) Appl. No.: 15/573,929

(22) PCT Filed: Jun. 2, 2016

(86) PCT No.: PCT/EP2016/062572
§ 371 (c)(1),
(2) Date: Nov. 14, 2017

(87) PCT Pub. No.: WO2016/193400
PCT Pub. Date: Dec. 8, 2016

(65) Prior Publication Data
US 2018/0290364 A1 Oct. 11, 2018

(30) Foreign Application Priority Data
Jun. 3, 2015 (DE) .............. 102015210318

(51) Int. Cl.
*B29C 48/34* (2019.01)
*B29C 48/355* (2019.01)
(Continued)

(52) U.S. Cl.
CPC ............ *B29C 48/355* (2019.02); *B29C 48/10* (2019.02); *B29C 48/256* (2019.02);
(Continued)

(58) Field of Classification Search
None
See application file for complete search history.

(56) References Cited

U.S. PATENT DOCUMENTS

| | | | |
|---|---|---|---|
| 3,663,134 A | 5/1972 | Coquelin | |
| 3,810,725 A | 5/1974 | Trub et al. | |

FOREIGN PATENT DOCUMENTS

| | | |
|---|---|---|
| DE | 102005051874 A1 | 5/2007 |
| JP | S58164722 U | 11/1983 |
| WO | WO2012032128 A1 | 3/2012 |

OTHER PUBLICATIONS

PCT Notification of Transmittal of Translation of the International Preliminary Report of Patentability dated Dec. 21, 2017, issued for PCT Application No. PCT/EP2016/062572, as well as the English translation document, 7 pages.

*Primary Examiner* — Monica A Huson
(74) *Attorney, Agent, or Firm* — Bret E. Field; Bozicevic, Field & Francis LLP

(57) ABSTRACT

Calibration basket having exchangeable air guiding elements composed of porous material. The invention relates to a guiding device and to methods for guiding a plastic film, wherein the plastic film can be guided by means of an air cushion, wherein the guiding device comprises a plurality of blower elements (31) each having the foil owing features: at least one supporting element (35), at least one film-guiding element (34), which is at least partially porous, preferably microporous, and which is connected to the supporting element (35). At least one fastening element is provided, by means of which the supporting element (35) and the film-guiding element (34) can be detachably fastened to each other.

16 Claims, 5 Drawing Sheets

Figure 1:
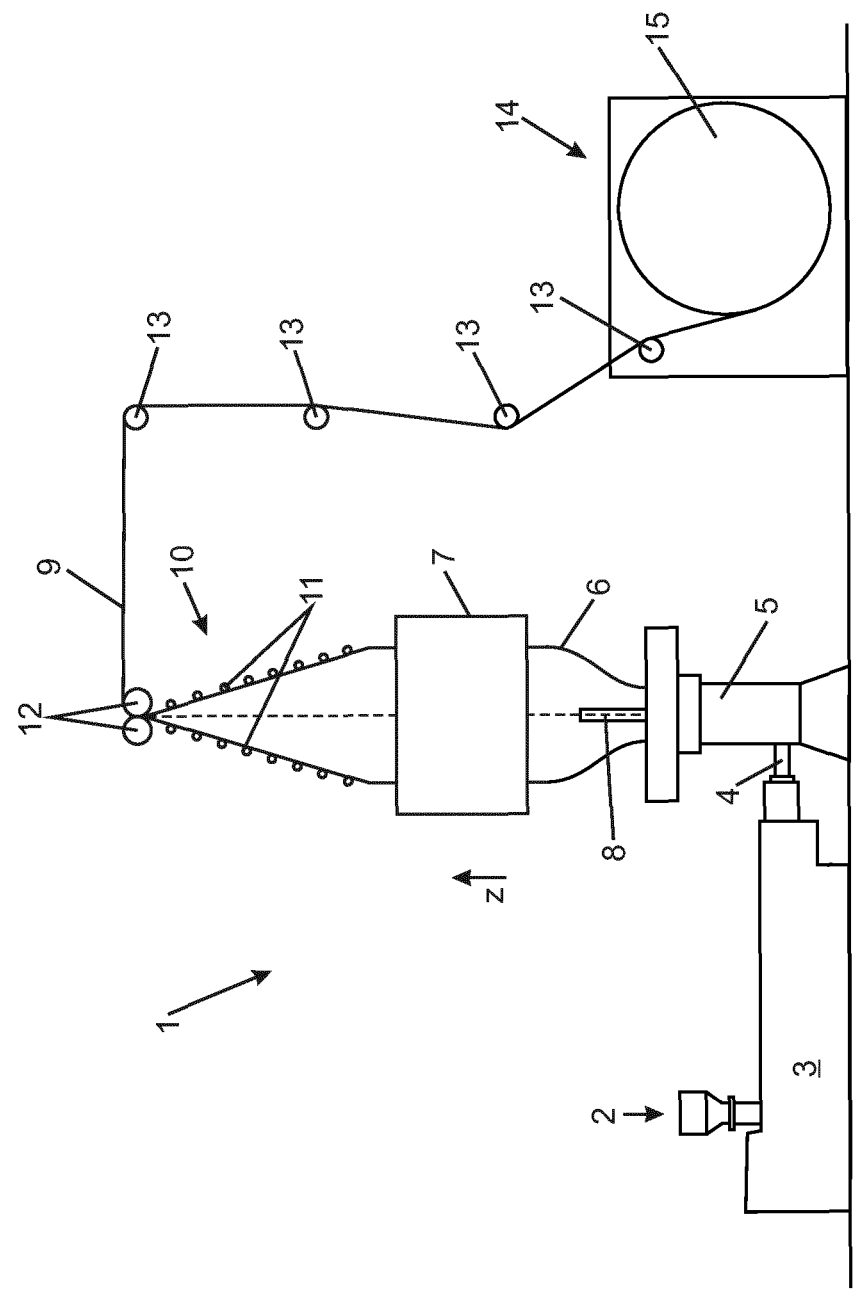

(51) Int. Cl.
*B29C 48/10* (2019.01)
*B29C 48/25* (2019.01)
*B29C 48/50* (2019.01)
*B29C 48/90* (2019.01)
*B29C 55/28* (2006.01)
*B29C 48/265* (2019.01)

(52) U.S. Cl.
CPC .......... *B29C 48/265* (2019.02); *B29C 48/503* (2019.02); *B29C 48/908* (2019.02); *B29C 55/28* (2013.01); *B29K 2823/06* (2013.01)

GUIDING DEVICE AND METHODS FOR GUIDING A PLASTIC FILM, AND BLOWN FILM INSTALLATION

The invention relates to a guiding device for guiding a plastic film according to the preambles of claims 1 and 13, a blown film installation according to the preamble of claim 16 and a method according to the preamble of claim 17.

In many areas it is necessary to guide a film. In equipment for the production of plastic films, there is the particular problem that these films, if they are not sufficiently cooled down, are very susceptible to damage, such as so-called markings. Markings are streaks or dots that have non-standard transparency and other properties. Such damaged films are often no longer suitable for the intended purpose.

Said equipment for the production of plastic films is, for example, a blown film extrusion installation in which initially at least one plastic granulate is incited. The resulting melt is then distributed annularly in the extrusion die before it is then pushed outward through a ring nozzle of the extrusion die. The resulting plastic film tube is then pulled off with a pulling device. Between ring nozzle and pulling device a calibration device and/or a flattening device are usually arranged. This calibration device and/or flattening device are guiding devices in the sense of the invention.

Especially in the area of the calibration device such plastic films are usually not sufficiently cooled down, because the air surrounding the film can often, even if it is cold, not sufficiently remove heat from the film. Therefore, special attention should be paid to the calibration basket.

In the recent past, guiding devices have therefore been equipped such that the films can be guided by means of an air cushion. Thus, a contact of the film with parts of this guiding device is effectively avoided. This also has advantages when producing sticky films.

EP 1 722 956 A1 discloses such a guiding device which comprises a plurality of blower elements, from which air can flow, which keeps the film at a distance from the blower element. In this case, such a blower element consists of at least one supporting element and at least one film-guiding element. This film-guiding element at least partially comprises a porous, preferably microporous material. The blower element disclosed in the said publication further discloses that the supporting element and the film-guiding element are firmly connected to one another.

Experience shows that the porous material fouls, so that the air-permeable pores are clogged and thus blocked. After a certain time, a reliably supporting air cushion can no longer be produced. The porous material of the blower elements must be cleaned. Meanwhile, the guiding device is not available, so that possibly the entire system, e.g., the blown film extrusion installation, can not be utilized.

The object of the present invention is therefore to propose a guiding device by means of which the downtime can be reduced.

This object is achieved by the features of claims 1, 3 and 16 and by a method having the features of claim 17.

Accordingly, at least one fastening element is provided, by means of which the supporting element and the film-guiding element can be detachably fastened to each other.

Thus, the film-guiding element can, if it has fouled to the extent that it no longer can carry out its proper function, be detached from the supporting element and, for example, can be cleaned separately. If, for example, further film-guiding elements already exist, then they can be fastened directly to the supporting elements again, so that the guiding device is available again after a short period of time. The downtime of the installation in which the guiding device is used, thus is limited to the time required to replace the film-carrying elements. While the dismounted film-guiding elements are cleaned, the system, in particular the blown film extrusion installation, again can produce film.

It is particularly advantageous if the fastening element is a clamping device, by means of which the supporting element and the film-guiding element are clamped to one another. In this case, there is a substantially defined fastening force, so that the personnel who carries out the replacement, does not have to pay attention to the fastening force. As a result, the replacement takes place quickly, so that the downtime is further reduced.

In a further configuration, it is provided that the fastening element can be actuated without tools. Thus, with a flick of the wrist the clamping force of the fastening element is neutralized and the film-guiding element can be removed. In doing so, the replacement process is accelerated again and the downtime is further reduced.

In an advantageous embodiment, the fastening element may be at least a clamp-like element. In the case of a clamp-like element, at least two clamping points, lines or surfaces facing one another are generally provided, each of which providing a force directed in the direction of the other clamping point(s). Thus, these clamping points, lines or surfaces can hold parts between them clamping. In the case of several parts, such as the supporting element and the film-guiding element herein, these can also be pressed against one another using these forces. In this case, the clamp-like element provides a force which is greater than the force which is generated by the air pressure prevailing in the interior of the blower element. This ensures that the air pressure does not exert such a high counterforce on the clamp-like element that the air between the supporting element and the film-guiding element can escape.

In an alternative and likewise advantageous embodiment of the invention, at least one over-center catch is provided as the clamping element, which is preferably arranged on the supporting element. An over-center catch is also capable of providing forces along clamping points, lines or surfaces so that the support element and the film-guiding element can be pressed against one another. An over-center catch has the advantage that it is quick and easy to actuate.

In a further configuration of the invention, it is provided that the supporting element and/or the film-guiding element comprise at least one hook and/or at least one rail in which parts of the film-guiding element or the supporting element can be mounted and/or inserted. In order to keep the construction and manufacturing costs low, it is preferred to configure only the supporting element in this way. The film-guiding element and the supporting element can thus be connected with one another in a very simple manner, wherein both can initially be brought into contact, for example along a line. The film-guiding element can now be "folded" so that the film-guiding element and the supporting element can form the necessary cavity. This provides a very simple and thus rapid mounting option. The contact edge of the film-guiding element and supporting element lying opposite the rail or the hook can then advantageously be acted upon with force by one of the fastening elements described above, so that a particularly simple and rapid replacement option is provided in this combination, wherein the replacement also can take place while the entire guiding device can remain for example in the blown film extrusion installation.

In a further development of the invention, at least one sealing element is arranged between the supporting element and the film-guiding element, which sealing element serves to prevent an air leakage from the cavity formed by the two aforementioned elements. It is advantageous if the sealing element comprises a compressible material, so that a high tightness is ensured.

In a further advantageous configuration of the invention, it is provided that the film-guiding element comprises a circumferential edge which defines an area. This area can lie in a plane, i.e., can be two-dimensional. But it is also conceivable that it is a curved area, but in which then advantageously two edges, which are opposite, run straight and parallel to one another. Furthermore, it is provided in the described configuration according to the invention that at least parts of the surface of the film-guiding element, which are located within the edges, are located outside the described area. These parts of the surface are shaped so that they take over the guiding of the film. In a particularly preferred embodiment of the invention it is provided that the surface within said edge has at least two local maxima, which are interconnected by a recess, wherein parts of the surface areas connecting the maxima are formed in a circular arc, wherein the radius of this circular arc advantageously corresponds to the radius of the largest format that can be produced on the machine.

In particular, it is advantageous if the surface regions lying within said edge are configured without edges and/or without corners. This avoids possible damage to the film tube particularly well.

In an advantageous configuration of the film-guiding element, it is provided that this film guiding element consists at least partially of sintered plastic material. This is a particularly cost-effective way of producing a film-guiding element with sufficient air permeability, wherein in the case of fouling, which—as mentioned above—make it necessary to replace these elements in the guiding device, a cleaning, which is sometimes elaborate and therefore expensive, can be dispensed with. Instead, the fouled elements can be disposed of and replaced with new elements.

It is advantageous if the plastic material comprises polyethylene or is even made completely of polyethylene, so that the film-guiding element can be easily recycled.

The supporting element, on which at least one fastening element, as described above, is arranged, can already independently constitute an invention. Likewise, a film-guiding element described in the preceding paragraphs can constitute an independent invention.

The abovementioned object is achieved based on a guiding device by means of which the plastic film can be guided by means of an air cushion, wherein the guiding device comprises a plurality of blower elements each having the following features:
  at least one supporting element,
  at least one film-guiding element,
    which is at least partially porous, preferably microporous, and
    which is connected to the supporting element,
  at least one bracing element by means of which the supporting element can be connected to an adjusting mechanism of the guiding device,
  in that at least one fastening element is provided by means of which the supporting element and the bracing element can be detachably fastened to each other.

In other words, the film-guiding element and the supporting element constitute a unit which is completely detached and removed from the guiding device. Thus, the downtime can also be significantly reduced. Said unit can be separated, for example, outside the guiding device for the purpose of cleaning or even completely cleaned.

The at least one bracing element is preferably fastened to moving parts of the guiding device, which means that the bracing element is displaceable relative to the base frame in order to be able to adapt to the film diameter. The at least one bracing element can also be embodied in several parts, wherein one part can be fastened to the supporting element. A fastening may be a clamping fastening, fastening by means of a screw, a lever mechanism or any other fastening device, which ensures that the film-guiding element is at a fixed distance to the movable part of the guiding device to which the bracing element is fastened. Alternatively, the bracing element may also be fastened to the support element and detachably connected to the movable part of the guiding device.

In an advantageous embodiment, it is provided that the at least one bracing element is formed for feeding a fluid, so that, in addition to the bracing effect, the necessary fluid can be supplied via the bracing element to the film-guiding element. In this way, components can be saved, which leads to cost savings. For this purpose, the bracing element preferably comprises a continuous cavity, in particular it is formed as a piece of pipe. A supply line for the fluid is then advantageously fastened to the end facing away from the film-guiding element.

In a particularly advantageous further development of the invention it is provided that the fastening is formed as a bayonet closure. In this case, the replacement of a blower element is feasible with only a few flicks of the wrist, which can lead to an additional shortening of the downtime of the device.

The above object is also achieved by a blown film installation according to claim 16. Accordingly, it is provided that the blown film installation is configured according to the above description and/or according to claims 1 to 15.

The stated object is additionally achieved by a method according to claim 17. With this method, the same advantages are achieved as they are achieved in connection with the guiding device according to the invention.

Further advantages, features and details of the invention will become apparent from the following description in which, with reference to the figures, various exemplary embodiments are explained in detail. The features mentioned in the claims and in the description may each be essential to the invention individually or in any combination of mentioned features. Within the scope of the entire disclosure, features and details described in connection with the method according to the invention apply of course also in connection with the calibration basket according to the invention and in each case vice versa, so that mutual reference is or can be made always to the individual aspects of the invention with respect to the disclosure.

Figure 2:
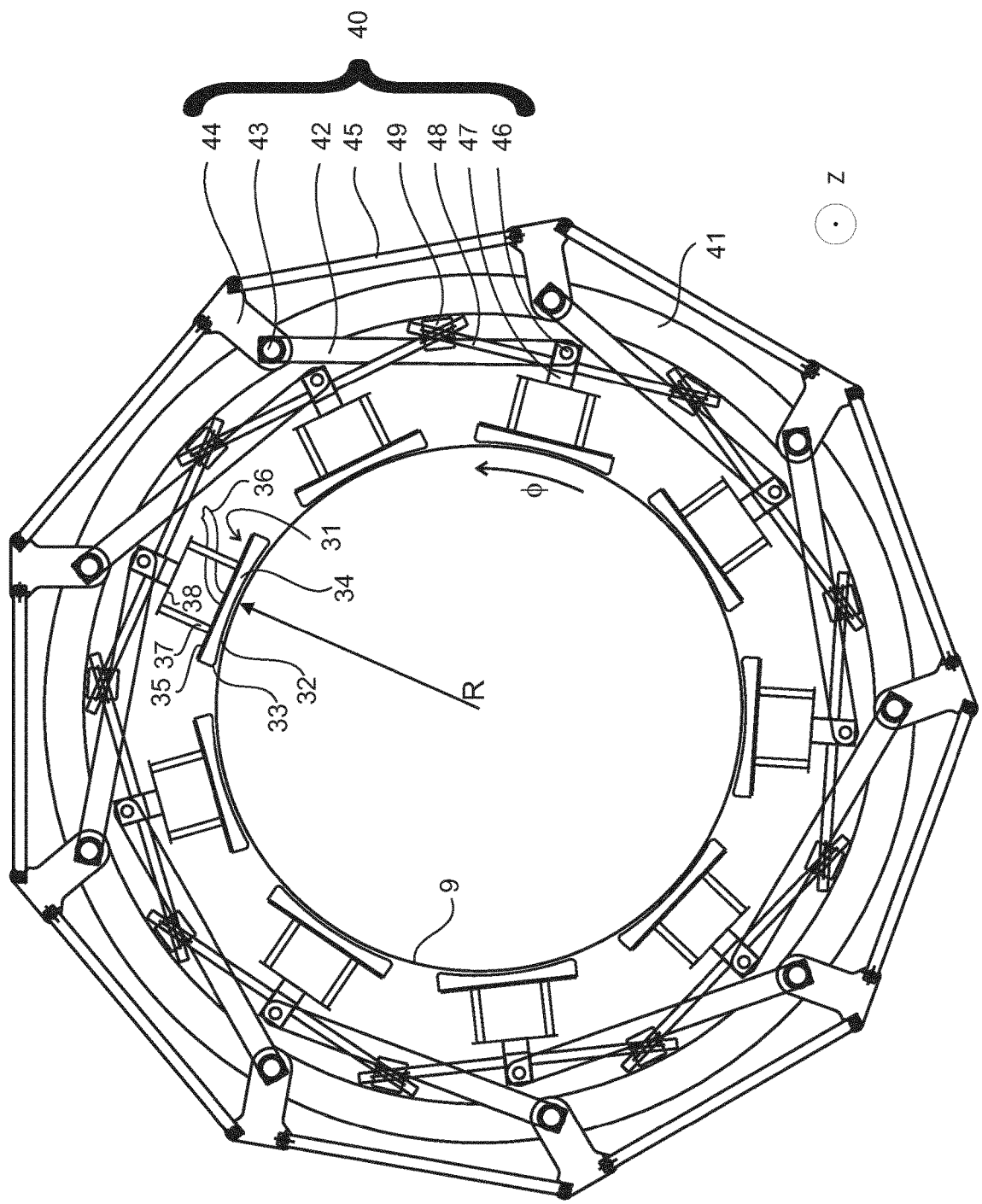
Figure 3:
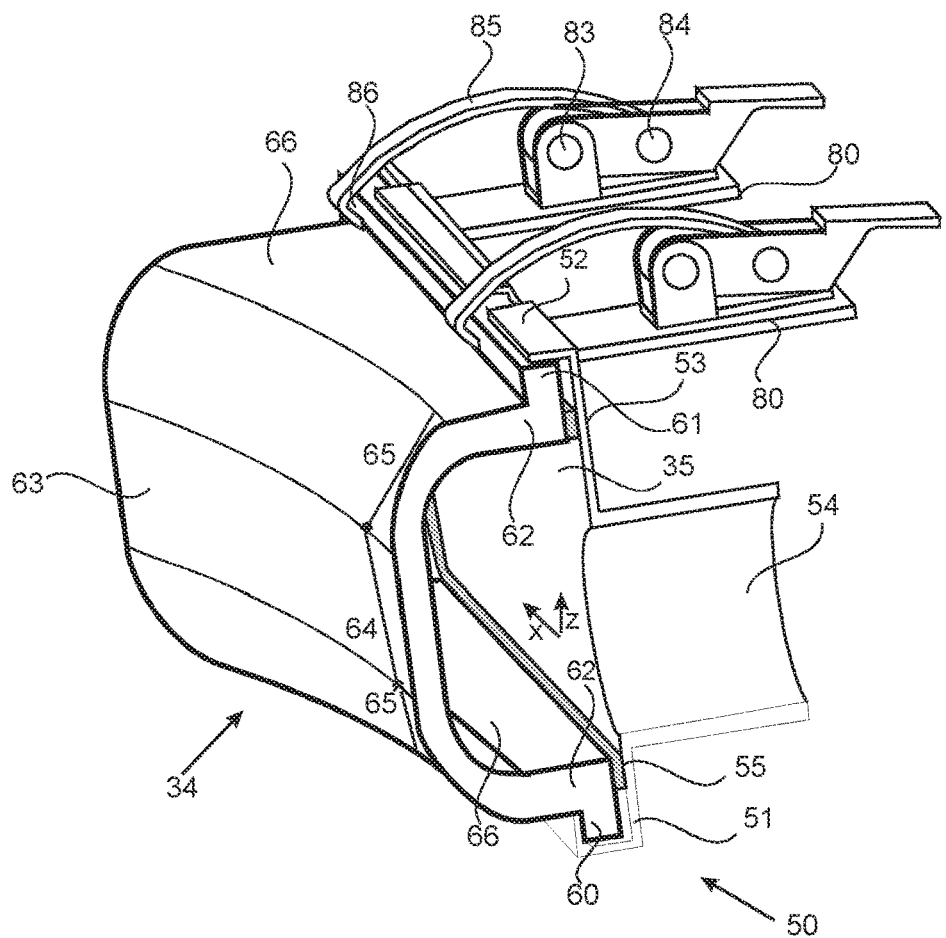
Figure 4:
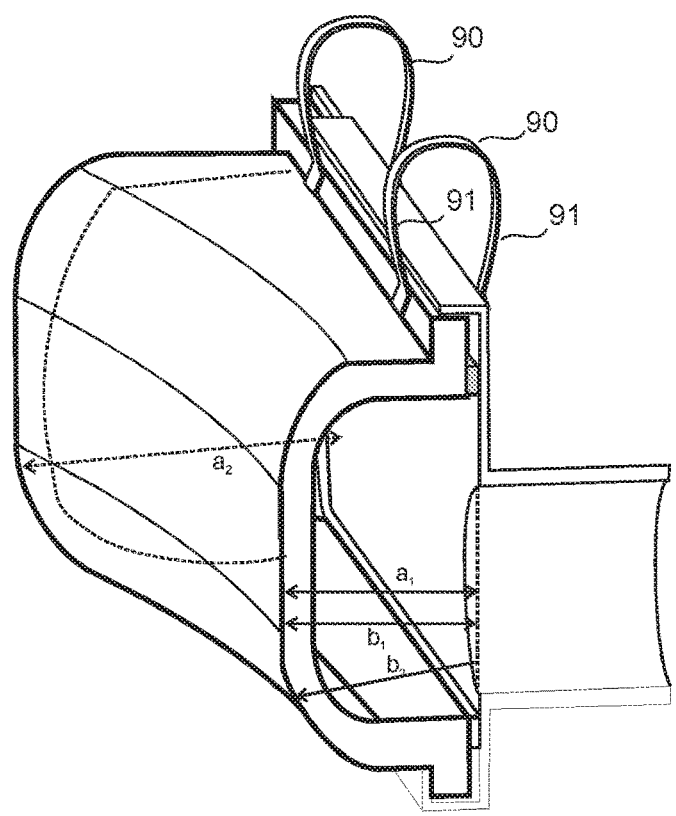
Figure 5:
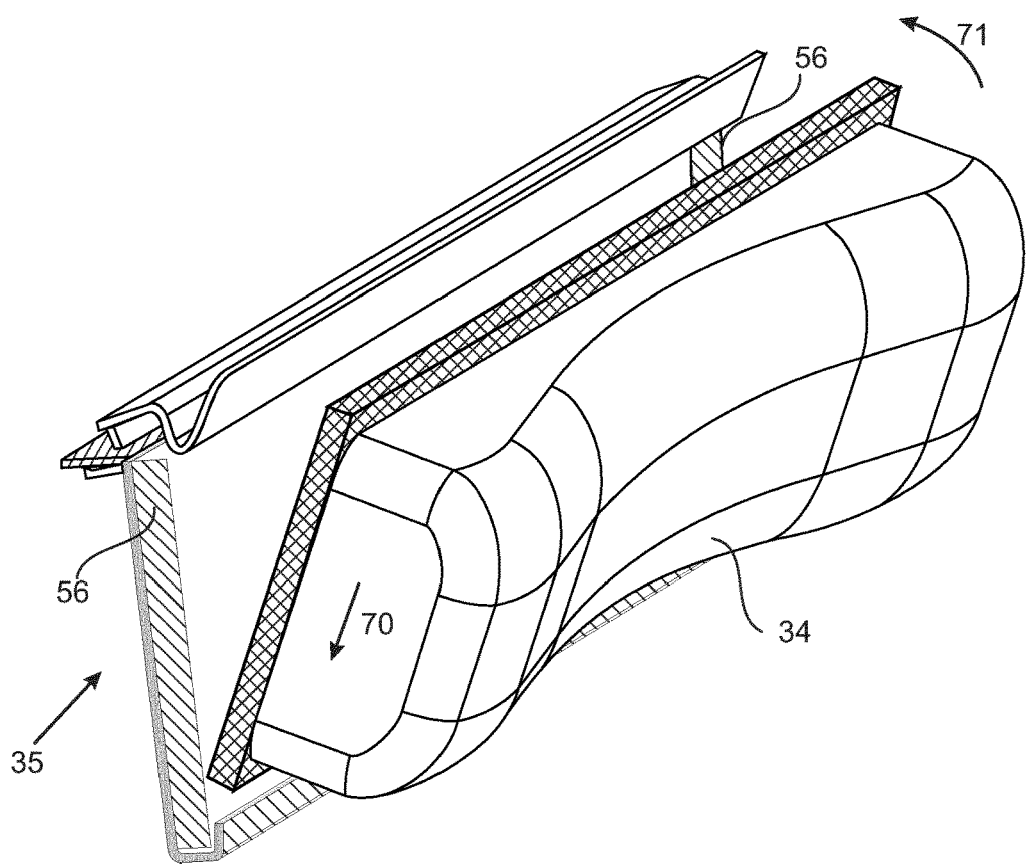
Figure 6:
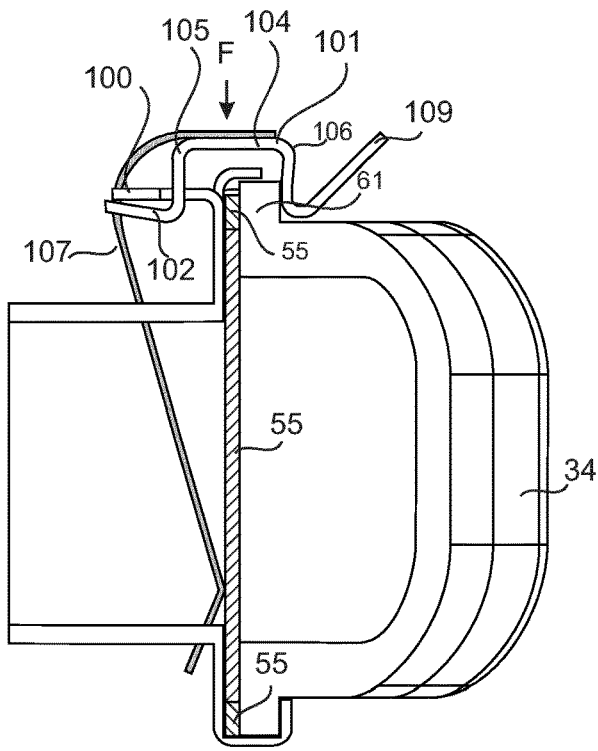
Figure 7:
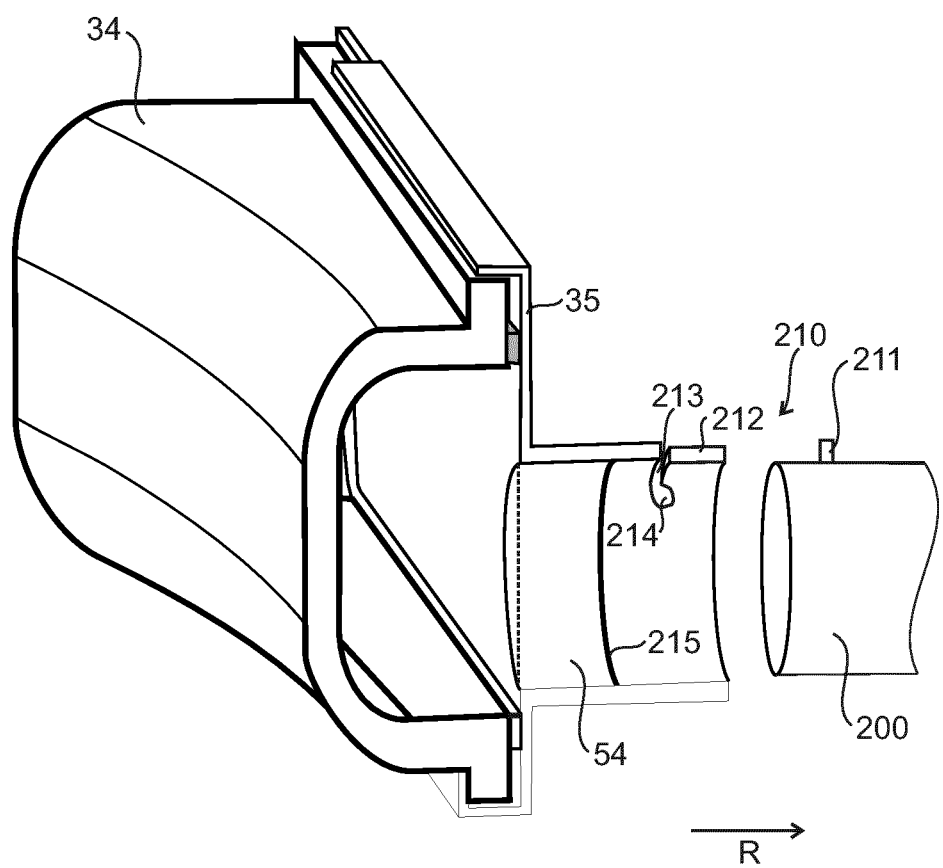

In the individual figures:

FIG. 1 shows a schematic diagram of a blown film extrusion installation according to the invention FIG. 2 shows an exemplary embodiment of a guiding device according to the invention FIG. 3 shows a first exemplary embodiment of a blower element FIG. 4 shows a second exemplary embodiment of a blower element FIG. 5 shows a third exemplary embodiment of a blower element with folded film-guiding element FIG. 6 shows a third exemplary embodiment of a blower element FIG. 7 shows a fourth exemplary embodiment of a blower element FIG. 1 shows a schematic diagram of a blown film extrusion installation 1 according to the invention, which comprises a calibration device 7 according to the invention. The filler neck 2 is supplied with a plastic or a plastic mixture, which is then plasticized in the extruder 3. Via a connecting line 4, the resulting mass is supplied to the blow head 5, by means of which a film tube 9 is formed from the mass. The blow head 5 may be associated with other extruders, so that multilayer films can be produced.

The film tube 9 leaves the blow head by a ring nozzle which is not visible in this illustration, in the transport direction z.

The film tube 9 is, when leaving the blow head 5, initially in the form of a film bubble 6, in which there is a slightly higher internal pressure compared to the ambient pressure. This is achieved by the supply of compressed air through the blower nozzle 8. Due to the increased internal pressure, the not yet solidified material of the film tube expands. Ultimately, both the diameter of the finished film tube and the thickness of the film material are adjusted in this way.

Subsequently, the not yet solidified film bubble 6 enters the calibration device which is called calibration basket 7. Here, the diameter of the film tube is restricted. Within the calibration device of the film tube cools to a temperature at which a subsequent deformation is no longer possible or only with the use of large forces. The position at which this phase transition occurs is often called the "frost line".

Within a prior art calibration device, the film tube is guided by plates by means of which compressed air is directed onto the film tube. This compressed air serves on the one hand to cool the film tube and on the other hand prevents contact of the plates by the film tube. In further calibration devices, the film tube can also be guided by rollers.

After leaving the calibration device, the tube enters a flattening device 10 in which the film tube is almost completely reshaped into a two-ply film web. Hereby, the film tube is guided between pairs of guiding elements 11, which assume a smaller and smaller distance from each other in the course of the transport direction z. The guiding elements can be configured analogously to the film-guiding elements contained in the calibration devices according to the invention. The complete flattening is done by a squeezer, which consists of a pair of squeezing rollers 12. The squeezing rollers 12 thereby prevent air from remaining inside the film tube during its further transport.

The film tube 9 or the resulting film web can now be guided through a reversing device, not shown, or, as in the case of the device shown, is supplied directly via deflecting rollers 13 to a winding device 14, where the film web is processed into a winding 15.

FIG. 2 shows a plan view of a guiding device according to the invention, referred to hereinafter as the calibration basket 7, which guides the film tube 9 by means of the blower elements 31. Seen on a plane of the calibration basket in the direction of the transport direction z (said plane is substantially orthogonal to the transport direction), a number—in the exemplary embodiment shown, 9—of blower elements 31 is preferably distributed uniformly over the circumference of the film tube 9. Generally, a calibration basket comprises a plurality of such blower element arrangements, the blower elements of two adjacent planes being rotated relative to one another in the circumferential direction φ, so that the film tube 9 is guided ideally over the entire circumference as it passes through the calibration basket 7.

Surfaces of the blower elements 31 facing the film tube 9 may be straight, i.e., tangential to the circumferential direction of the film tube 9. They may also comprise a circular arc-shaped surface 32, as shown in FIG. 2, wherein the radius of the associated circular arc preferably corresponds to the radius R of the largest film tube that can be guided by means of the calibration basket, or is slightly larger, so that at this size of the film tube this film tube comprises the largest guide in terms of area. However, the circular arc radius can also be larger than the radius of the largest film tube that can be guided by means of the calibration basket. This can have manufacturing advantages if calibration baskets of different size diameters are to be equipped with uniform blower elements 31.

Blower elements 31 preferably comprise at least two elements, wherein the film-guiding element 34 is the element facing the film tube 9 and which is arranged on a supporting element 35. The supporting element may in turn comprise a rear opening to which a hose 36 is fastened. This hose can be used to guide a gas which is under slight overpressure relative to the atmospheric pressure, in particular air, into the space enclosed by the supporting element 35 and the film-guiding element. For this purpose, the hose 36 is connected directly or indirectly to an overpressure source, for example to a blower or a compressor. The corners 33 of the film-guiding elements are preferably rounded, whereby damage to the film tube 9 is largely avoided. The supporting element 35 is preferably fastened via stud bolts 37 to a holding plate 38.

The blower elements are adjustable via an adjusting mechanism 40, wherein the blower elements are adjustable in the radial direction such that the centers of the film tube 9 and the circular arc of the surface of the film-guiding element remain substantially in the same position. A displacement of the blower elements 31 in the circumferential direction of the film tube is possible and not disadvantageous.

The adjusting mechanism 40 is arranged on the base frame 41 of the calibrating basket 7 and comprises pivot levers 42, which are arranged single-endedly pivotally in pivot bearings 43 in the base frame. The pivot levers 42 are rotatably connected to adjusting levers 44, which in turn are interconnected with coupling rods 45, so that a single drive, which is not shown, is able to pivot all the pivot levers 42. At the free end of the pivot levers, holders 47 are rotatably supported via a rotary joint 46. Each holder 47 carries not only its respective associated holding plate 38, but also rods 48 which extend away from the holder 47 in both directions. The mutually facing ends of the rods 48 of two adjacent holders 47 are slidably supported in a common sliding bearing 49, wherein the angle between these two rods 48 always remains constant.

FIGS. 3 to 6 now show various exemplary embodiments of blower elements, wherein identical components are designated by the same reference numerals, and for the sake of clarity, not all reference numerals appear in all figures.

The support element 35 comprises at its lower edge 50 a fold, preferably with two edges, or a rounding, whereby a U-shaped and rail-like recess 51 is formed. The recess 51 serves to receive the projection 60 of the film-guiding element 34. Instead of a recess, for example, a plurality of spaced-apart hooks may be provided, which serve the same purpose already described.

In the region of the upper edge of the supporting element 35, a further fold 52 may be provided, which may occupy an angle of 90 degrees relative to the main surface 53 of the supporting element 35. This fold serves as a guiding aid when inserting the film-guiding element 34, wherein a correct positioning of the film-guiding element 34 relative to the supporting element 35 and thus relative to the calibration basket can be achieved. In this case, it is ensured that the film tube 9 is conveyed on the intended way.

The film-guiding element 34 comprises not only a projection 60 on its lower longitudinal side, but also a projection 61 on its upper longitudinal side, which serves a purpose which will be described below. The projections 60 and 61, together with further components of the film-guiding element 34, can form a circumferential edge 62, by means of which the film-guiding element 34 is sealingly connected to the supporting element 35. In order to increase the tightness, a—preferably likewise circumferential—sealing element 55, for example, a rubber band, is provided between the circumferential edge of the film-guiding element 34 and the support element 35. The circumferential edge spans a plane in the x-z direction. The remainder of the outer surface 63 of the film-guiding element 34 is, except for the projections 60 and 61, substantially completely outside of said plane. Thus, the film-guiding element 34 and the supporting element 35 form a closed space, which can be supplied with a fluid, in particular a gas, preferably air, via the connecting piece 54.

The outer surface preferably has curved shape. Viewed in the x-direction, the distance of the outer surface in the center of the film-guiding element 34 has a minimum distance $a_1$. This distance increases steadily towards the ends of the film-guiding element 34, the greatest distance $a_2$ being observed just before the ends, before the outer surface directly at the ends merges into the rounded corners 33, as already described in connection with FIG. 2. The purpose of this shaping of the outer surface with a viewing direction in the x-direction has also already been described in connection with FIG. 2, namely the optimum guidance of the film tube 9 at least at a specific diameter thereof.

Viewed in the z-direction (at a fixed point in the x-direction), the profile is different. Here, the maximum, i.e., the distance $b_1$, is preferably provided in the center of the film-guiding element. The maximum extends in the z-direction over the region 64. i.e., in this region, the outer surface is preferably parallel to the outer wall of the film tube 9. Towards the sides there are regions 65, which are rounded, i.e., that the outer surface seen in or against the z-direction moves steadily further away from the outer periphery of the film tube 9. In other words, outside the region 65 are regions where the distance $b_2$ is smaller than the distance $b_1$. Especially on the inlet side, such a rounding offers the advantage that damage to the film can be avoided. The regions 65 can continuously merge with the side walls 66, which are arranged for example orthogonal to the z-direction.

With reference to FIG. 5, the positioning of the film-guiding element 34 at the supporting element 35 can now be explained. First, the element 34, with its lower projection 60, is inserted in the recess 51 in a linear movement, which is indicated by the arrow 70, The sealing element 55, which is not shown in this figure, is already arranged on the element 34 or preferably on the supporting element 35 at this time. With a pivoting movement, which is indicated by the curved arrow 71, the upper projection 61 is now moved in the direction of the supporting element 35 until the film-carrying element 34 rests completely with its edge against the supporting element 35 and/or the sealing element 55. In order to achieve a centering of the film-guiding element 34 relative to the supporting element 35, at least one guide plate 56 is arranged laterally on the supporting element 35; preferably, these are found on both sides. It should be noted at this point that the position indications "at the top" and "at the bottom" and "lateral" with respect to the components of the film-guiding element 34 and/or the support element may also be reversed. For example, the guide plates 56 can also be arranged at the top and/or at the bottom. "At the top", "at the bottom" and "lateral" refer to the usual indications.

For permanent pressing of the projection 61 and thus of the film-guiding element 34 onto the support element 35 fastening devices are provided. These can be designed in many ways. An example would be screws that pierce the projection 61 and which can be screwed into threads that are incorporated in the supporting element.

However, preferred are easier-to-use fasteners which can be actuated without tools, as will be explained with reference to the exemplary embodiments of FIGS. 3 to 6.

In FIG. 3, sheets 80 are arranged on the back of the support element 35 on which known over-center catches 81 are arranged, in which the lever 82 is pivotable about the pivot point 83, A clamp 85 is pivotable about a further pivot point 84 and exerting with its hook 86 a force on the projection 61, said force being directed in the direction of the supporting element 35. Once the pivot point 84 and the touchdown point of the hook 86 are below the pivot point 83, the film-guiding element 34 and the support element are firmly braced together. To release this bracing only the lever 82 needs to be pivoted about the pivot point 83, which can be done manually in a simple manner. After inserting a (new) film-guiding element 34, a bracing can take place by again actuating the lever 82 in the reverse direction. An actuation of the fastening device is therefore possible completely without tools.

FIG. 4 shows a very simple and therefore cost-effective variant of a fastening device. In this case, it is at least one clamp 90, the legs 91 of which legs 91 are biased, each exerting a force in the direction of the other leg. Thus, a clamping, force is exerted on the film-guiding element 34 and the supporting element 35. After positioning and pivoting the film-guiding element 34 to the support element 35, the at least one clamp 90 can now be pushed onto the projection 61 and the supporting element 35 from above, so that both elements 34, 35 are pressed against one another.

FIGS. 5 and 6 show a further exemplary embodiment in which the bracing of the two elements 34, 35 can be done without manual operation. For this purpose, the supporting element 35 comprises at least one rear-side projection 100 in which at least one clamping element 101 can be mounted. For this purpose, the clamping element 101 is equipped with one end in hook shape 102. This hook shape can be integrated in the clamping element or separately positioned and fastened. The rear-side projection 100 can therefore provide a pivot point 103 for the clamping element. However, the following aspect is important: the clamping element 101 comprises an arc 104, so that the clamping element, similar to the clamp in the exemplary embodiment of FIG. 4, exerts a clamping force between the legs 105 and 106, by means of which the elements 34 and 35 are held together. A spring element 107 is arranged on the supporting element 35, preferably fastened, which biases the clamping element 101 with a force in the direction of the arrow F, wherein this force acts perpendicular to the clamping force. Thus, the clamping element is pressed from above in the direction of the supporting element. The advantage of this force becomes clear in connection with the at least one strip 109, which is an integrated extension of the clamping element 101 or a component fastened thereto. By its oblique arrangement it is now guided by the pivoting of the film-guiding element 35 in the direction of the arrow 71 (see FIG.

5) under the strip 109. As a result of the further pivoting, the strip 109 and thus the clamping element 101 are lifted upwards against the spring force F until the projection 61 has passed the leg 106. Then, the spring force F pushes the clamping element 101 back into its starting position, in which it presses the elements 34, 35 against each other.

The assembly of the film-guiding element to the support element 35 can thus be done without tools and in particular without manual operation, which greatly simplifies the assembly. For disassembly now only the clamping element 101 must be raised, so that the projection 61 can be guided freely below the clamping element.

FIG. 7 now shows parts of an exemplary embodiment. Shown is the blower element, comprising the film-guiding element 34 and the supporting element 35, wherein the supporting element in turn comprises a connecting piece 54.

The stud bolt is designed in this embodiment as a pipe 200, which has, for example, an outer diameter that is smaller than the inner diameter of the connecting piece. Thus, the connecting piece can be pushed onto the pipe 200. For secure fastening a bayonet closure 210 is provided, wherein the pipe 200 comprises at least one pin 211. As a counterpart, the connecting piece 54 comprises an axial slot 212 which continues in a circumferentially extending slot 213. At the end of this slot there is provided a roundish opening 214 provide that jumps back slightly towards R.

For fastening the blower element is pushed onto the pipe so that the pin can slide along the slot 212. Subsequently, the blower element is rotated until the pin engages in the opening.

Furthermore, a seal 215 is provided, which fulfills two tasks. First, it provides a spring force which pushes the pin 211 in the opening 214 in the direction R, so that an unintentional twisting is avoided. In addition, it prevents leakage of fluid through the fastening region. The spring force can of course be provided by an element other than the seal.

LIST OF REFERENCE NUMERALS

1 Blown film extrusion installation
2 Filler neck
3 Extruder
4 Connecting line
5 Blow head
6 Film bubble
7 Calibration device
8 Blower nozzle
9 Film tube
10 Flattening device
11 Guiding element
12 Squeezing roller
13 Deflecting roller
14 Winding device
15 Winding
31 Blower element
32 Circular arc-shaped surface
33 Corner of the film-guiding elements
34 Film-guiding element
35 Supporting element
36 Tube
37 Stud bolt
38 Holder plate
40 Adjusting mechanism
41 Base frame
42 Pivot lever
43 Pivot bearing
44 Adjusting lever
45 Coupling rod
46 Rotary joint
47 Holder
48 Rod
49 Sliding position
50 Lower edge of the supporting element
51 Recess
52 Fold
53 Main surface of the support element 35
54 Connecting piece
55 Sealing element
60 Projection
61 Projection
62 Circumferential edge
63 Outer surface
65 Regions
66 Side wall
70 Arrow
71 Curved arrow
80 Sheets
81 Over-center catch
82 Lever
83 Pivot point
84 Pivot point
85 Clamp
86 Hook
90 Clamp
91 Leg
100 Rear-side projection
101 Clamping element
102 Hook shape
103 Pivot point
104 Arc
105 Leg
106 Leg
107 Spring element
109 Strip
$a_1$ Minimum distance
$a_2$ Greatest distance
$b_1$ Distance
$b_2$ Distance
F Arrow
R Radius
$\phi$ Circumferential direction

The invention claimed is:

1. A guiding device for guiding a plastic film, wherein the guiding device comprises:
   a plurality of blower elements each comprising at least one supporting element and at least one film guiding element, wherein the film guiding element is at least partially porous, consists at least partially of sintered plastic material and is connected to the supporting element; and
   at least one fastening element is provided, by means of which the supporting element and the film-guiding element can be detachably fastened to each other.

2. The guiding device according to claim 1, wherein
   the fastening element is a clamping device, by means of which the supporting element and the film-guiding element are clamped to one another.

3. The guiding device according to claim 1, wherein
   the clamping element can be actuated without tools.

4. The guiding device according to claim 1, wherein the clamping element comprises a clamp.

5. The guiding device according to claim 1, wherein the clamping element comprises an over-center catch.

6. The guiding device according to claim 1, wherein the supporting element comprises at least one hook or at least one rail, in which parts, can be mounted or inserted.

7. The guiding device according to claim 1, wherein
a sealing element is arranged between the supporting element and the film-guiding element.

8. The guiding device according to claim 7, wherein the sealing element comprises a compressible material.

9. The guiding device according to claim 1, wherein
the film-guiding element comprises a circumferential edge, by means of which it can be positioned against the support element, wherein at least parts of the surface regions of the film-guiding element lie outside the area defined by the circumferential edge.

10. The guiding device according to claim 9, wherein the surface regions lying within the edge are formed without edges and/or without corners.

11. The guiding device according to claim 1, wherein
the plastic material comprises polyethylene.

12. A guiding device for guiding a plastic film, wherein the guiding device comprises:
a plurality of blower elements each comprising
at least one supporting element,
at least one film guiding element, wherein the film guiding element is at least partially porous, consists at least partially of sintered plastic material and is connected to the supporting element, and
at least one bracing element by means of which the supporting element can be connected to an adjusting mechanism of the guiding device; and
at least one fastening is provided by means of which the supporting element and the bracing element can be detachably fastened to each other.

13. The guiding device according to claim 12, wherein
the bracing element is formed for supplying a fluid and comprises a piece of pipe.

14. The guiding device according to claim 12, wherein the fastening is formed as a bayonet closure.

15. A blown film installation for producing a plastic film with a blow head for the extrusion of the plastic film and a guiding device
wherein
the guiding device is formed according to claim 1.

16. A method for guiding a plastic film, the method comprising employing a guiding device comprising:
a plurality of blower elements each comprising at least one supporting element and at least one film guiding element, wherein the film guiding element is at least partially porous, consists at least partially of sintered plastic material and is connected to the supporting element; and
at least one fastening element is provided, by means of which the supporting element and the film-carrying element are detachably fastened to each other.

* * * * *